Aug. 15, 1944.                C. DE BOER                2,355,707
             STRUCTURAL MEMBER AND METHOD OF MAKING SAME
                        Filed March 22, 1941
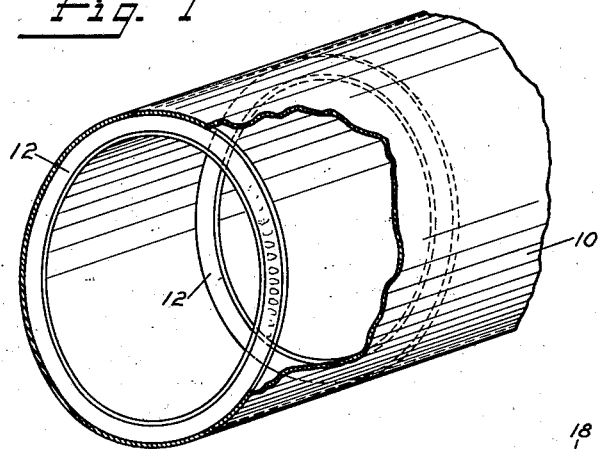
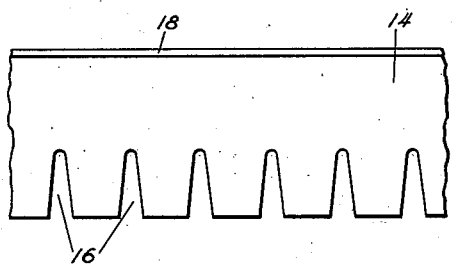
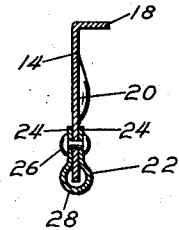
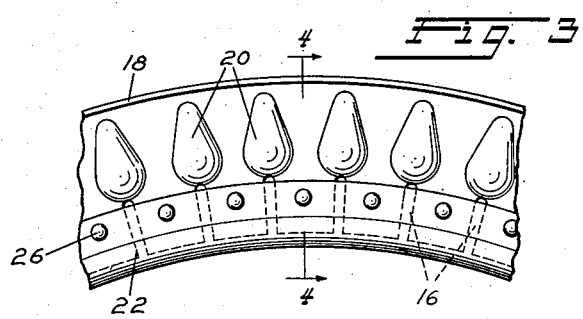
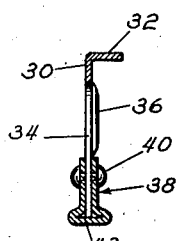
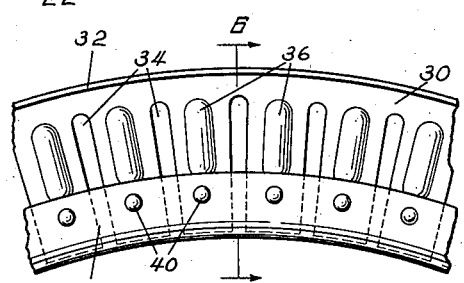
Inventor
Christian De Boer
Dawson, Ooms and Booth
Attorney Patented Aug. 15, 1944

2,355,707

UNITED STATES PATENT OFFICE 2,355,707

STRUCTURAL MEMBER AND METHOD OF MAKING SAME

Christian De Boer, Ashton, Md., assignor to Engineering and Research Corporation, Riverdale, Md., a corporation of Maryland Application March 22, 1941, Serial No. 384,760

5 Claims. (Cl. 29—155)

This invention relates to structural members and method of making the same and more particularly to the manufacture of relatively light weight curved structural members for reinforcing an outer skin or the like.

In a great many places, it is desirable to provide relatively light weight structural members which are curved in their own plane either as a skeleton construction or for reinforcing an outer skin or the like. For example, in aircraft, bulkheads of this character are employed in the fuselage and also in some instances in the wings, and it is essential that these members be light in weight and at the same time follow the curvature of the aircraft structure. In many other places, similar structural members are required.

It is one of the objects of the present invention to provide a structural member of this character which may follow substantially any desired curve, which is relatively light in weight, and at the same time possesses great strength, and which can be formed easily and inexpensively.

Another object of the invention is to provide a structural member formed entirely of sheet metal and which can readily be curved to any desired degree without the necessity of special tools or machinery.

Still another object of the invention is to provide an improved method of forming structural members of the character referred to of sheet metal.

The above and other objects and advantages of the invention will be apparent from the following description when read in connection with the accompanying drawing, in which:

Figure 1 is a partial perspective view of a structure embodying the invention;

Figure 2 is a side view of a sheet metal strip showing one stage in the method of the invention;

Figure 3 is a view similar to Figure 2, showing one completed structural member embodying the invention;

Figure 4 is a section on a line 4—4 of Figure 3;

Figure 5 is a view similar to Figure 3, showing an alternative construction; and Figure 6 is a section on the line 6—6 of Figure 5.

In the structure illustrated in Figure 1, which may represent a portion of an airplane fuselage or the like, there is an outer skin member 10, forming a closed section and reinforced periodically throughout its length by bulkhead members indicated generally at 12. These bulkheads are annular to reinforce the section 10 and to provide a skeleton frame upon which it is secured. While one particular use of bulkhead members of this type is shown, it will be apparent that the invention is adapted not only to this type of bulkhead but to various other types of structural members where employed as reinforcements or to form a separate skeleton frame.

In forming the structural members such as bulkheads 12 from a flat, elongated strip of sheet metal, such as indicated at 14 in Figure 2, one edge of the strip is formed with a series of open slots 16 extending partially toward the opposite edge. The depth of the slots 16 should be varied to some extent in accordance with the amount of curvature required in the final structural member, deeper slots being required for a greater degree of curvature. The particular structural member illustrated is formed with an angular flange at the edge opposite its slotted edge, as shown at 18, and where a flange of this type is employed, it is preferably formed on the strip prior to bending thereof, since its formation is easier at that time. After slotting the strip, the material thereof is deformed out of the plane of the strip to form a series of generally triangular indentations, indicated at 20 without, however, deforming either edge portion of the strip out of its original plane. As best seen in Figure 4, the indentations 20 are deeper adjacent the closed ends of the slots 16 than adjacent the flanged edge of the strip, so that the strip is caused to curve about its slotted edge. The degree of curvature can be controlled by the depth and by the spacing of the indentations so that any desired curvature can be obtained. It will be noted that the indentations 20 extend from a point adjacent the closed ends of the slots to adjacent the flanged edge of the strip, so that the strip is bent throughout its width without buckling.

The strip has now been formed to an approximation of the desired curvature, but lacks the necessary rigidity, especially along the slotted edge. It is therefore reinforced by providing a reinforcing member indicated at 22 extending along and secured to the slotted edge of the strip, the strip being first bent to the exact curvature desired in a vise or on a suitable form. The curved reinforcing strip 22 may take any desired shape, but as shown, is formed of a sheet metal strip bent upon itself to provide flanged portions 24 overlying the sides of the strip 14 at its slotted edge and riveted thereto between the slots by means of rivets 26. Between the edges 24 of the reinforcing strip it is bent outwardly substantially into circular form as shown at 28, to provide a rigid reinforcing column extending along the edge of the strip 14. Thus the reinforcing strip serves both to strengthen the structural member and to hold it securely in the desired curve. The shape of the indentations 20 as shown in Figures 3 and 4 is particularly advantageous in producing the desired curve in the structural member and also in strengthening the member against bending forces. The forces acting radially on the reinforcing member are resisted by the edge of the indentation acting as a column in compression. Thus the member has a great deal of strength to resist the radial loads and to resist buckling in a radial direction.

Figures 5 and 6 illustrate an alternative construction, which, while somewhat lighter than the embodiment shown in Figures 2 to 4, is also somewhat weaker. In this construction, a metal sheet indicated at 30 is formed with an angular flange 32 at one edge, and has a series of spaced slots 34 cut therein extending from its opposite edge through a substantial portion of the sheet. Between the slots radially extending indentations 36 are formed to stiffen the sheet. Due to the length of the slots 34 the sheet can easily be bent to any desired curvature in a vise or about a form, and has its curvature fixed by a reinforcing strip 38 secured along the slotted edge by rivets or the like, indicated at 40. The reinforcing member 38 is substantially similar to the member 22 of Figures 3 and 4, except that it has been flattened at its inner edge as indicated at 42 to decrease its radial width. This strip includes portions bent out of the plane of the sheet 30 to reinforce it against lateral bending and serves to maintain the strip with the desired degree of curvature.

While two embodiments of the invention have been shown and described in detail, it will be understood that these are illustrative only and are not intended as a definition of the scope of the invention, reference being had for this purpose to the appended claims.

What is claimed is:

1. A structural member adapted to reinforce a hollow structure comprising an elongated strip of sheet metal which is curved in its own plane, said strip being formed in its inner curved edge portion with a series of slots extending from its inner curved edge toward its outer curved edge a distance sufficient to enable the strip to be bent in its own plane without buckling its edge, the material of the strip being deformed out of the plane thereof to form a plurality of indentations each of which lies radially in line with one of the slots between its closed end and the outer edge of the strip, and a curved member narrower radially than the strip secured to the inner slotted end of the strip to reinforce it and to fix the curvature of the strip.

2. A structural member adapted to reinforce a hollow structure comprising an elongated strip of sheet metal which is curved in its own plane, said strip being formed in its inner curved edge portion with a series of slots extending from its inner curved edge partially toward its outer curved edge, the material of the strip being deformed out of its own plane to form a plurality of indentations each of which lies radially in line with one of the slots between its closed end and the outer edge of the strip, each of said indentations being of greater depth adjacent the closed end of the adjacent slot than adjacent the outer edge of the strip, and a curved member narrower radially than the strip secured to the inner slotted end of the strip to fix its curvature.

3. A structural member adapted to reinforce a hollow structure comprising an elongated strip of sheet metal which is curved in its own plane, said strip being formed in its inner curved edge portion with a series of slots extending from its inner curved edge partially toward its outer curved edge, the material of the strip being deformed out of its own plane to form substantially triangular indentations each of which is located between the closed ends of one of the slots and the outer edge of the strip of greater depth adjacent the slot than adjacent the outer edge of the strip, and a curved reinforcing member narrower radially than the strip secured to the inner slotted edge of the strip.

4. The method of forming a structural member from an elongated flat strip of sheet metal which comprises forming a series of spaced slots in the strip extending from one edge thereof partially toward the other edge, deforming the body of the strip between the closed ends of the slots and the unslotted edge of the strip to form indentations of greater depth adjacent the closed ends of the slots than adjacent the unslotted edge of the strip to cause the strip to curve in its own plane about its slotted edge without displacing either edge of the strip from its original plane, and securing a curved reinforcing member to the slotted edge of the strip.

5. The method of forming a structural member from an elongated flat strip of sheet metal which comprises forming a series of spaced slots in the strip extending from one edge thereof partially toward the other edge, and deforming the body of the strip from its original plane to form spaced indentations in the strip extending into the portion between the closed ends of the slots and the unslotted edge of the strip to cause the strip to curve about its slotted edge without displacing either edge of the strip from its original plane.

CHRISTIAN DE BOER.